No. 708,789. Patented Sept. 9, 1902.
G. M. WILLIAMS.
MACHINE FOR BOXING LITTLE CIGARS.
(Application filed June 21, 1900.)
(No Model.) 7 Sheets—Sheet 1.

Inventor:
George M. Williams
by Philipp, Sawyer, Rice & Kennedy
Atty's

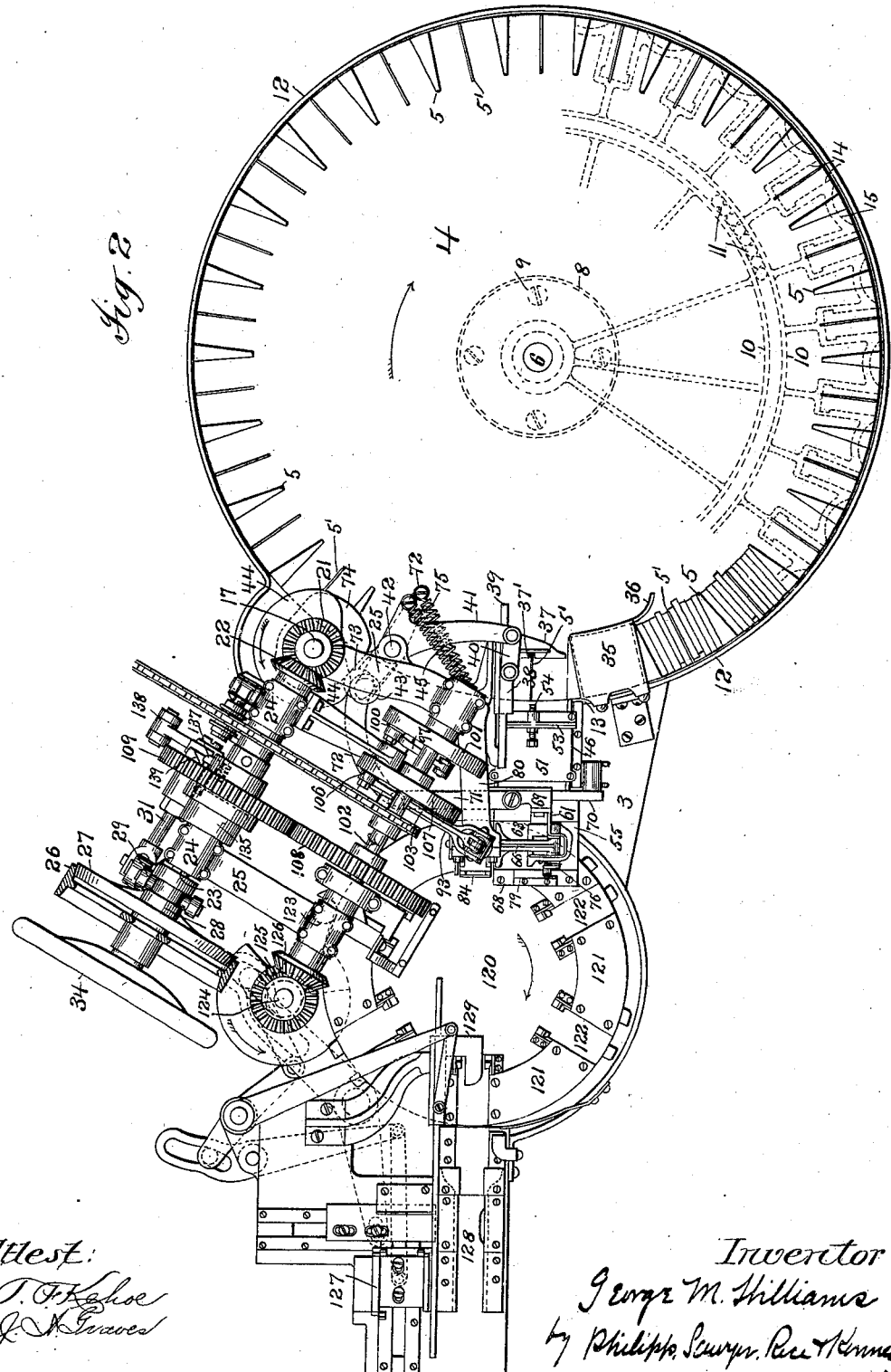

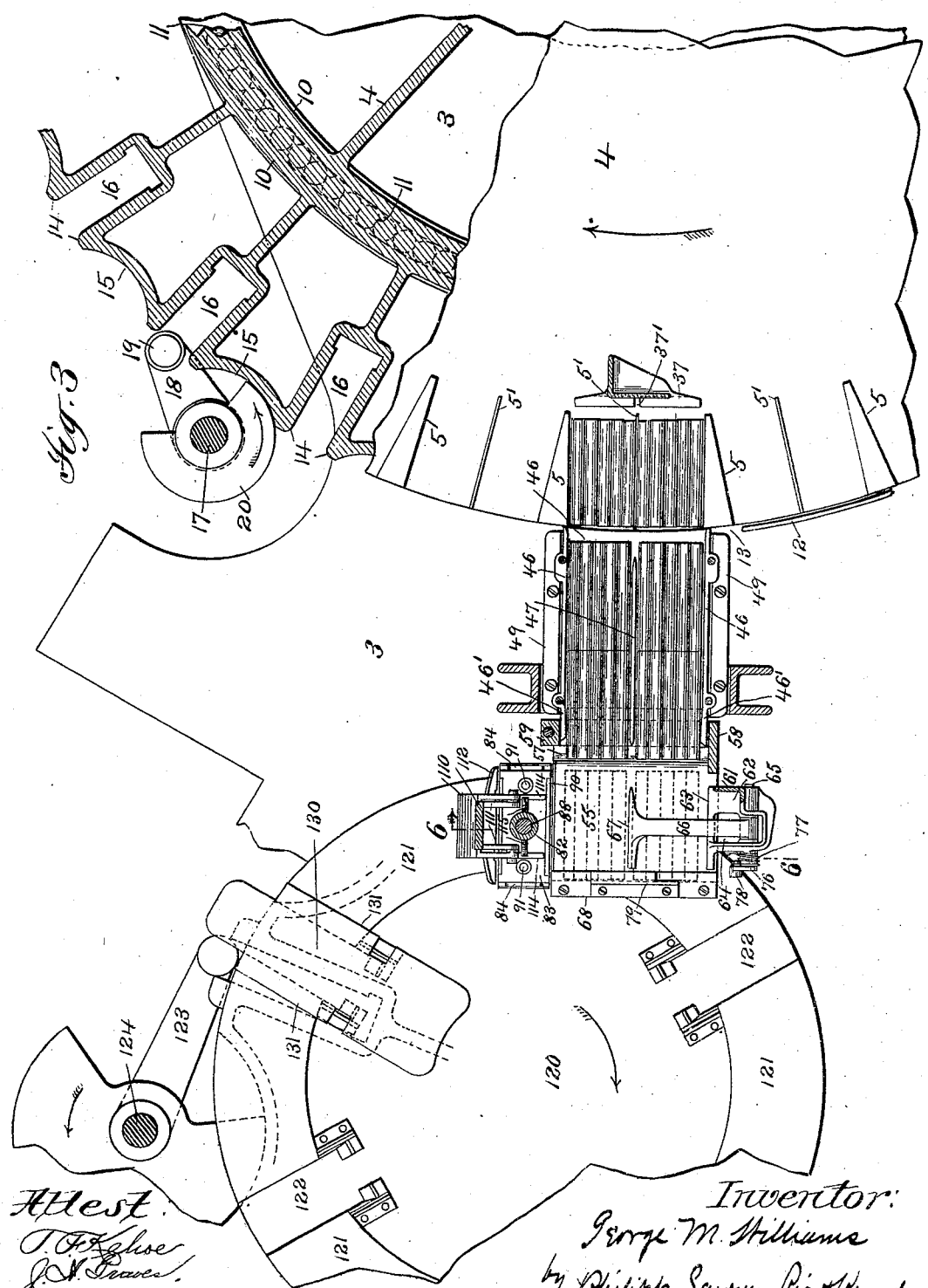

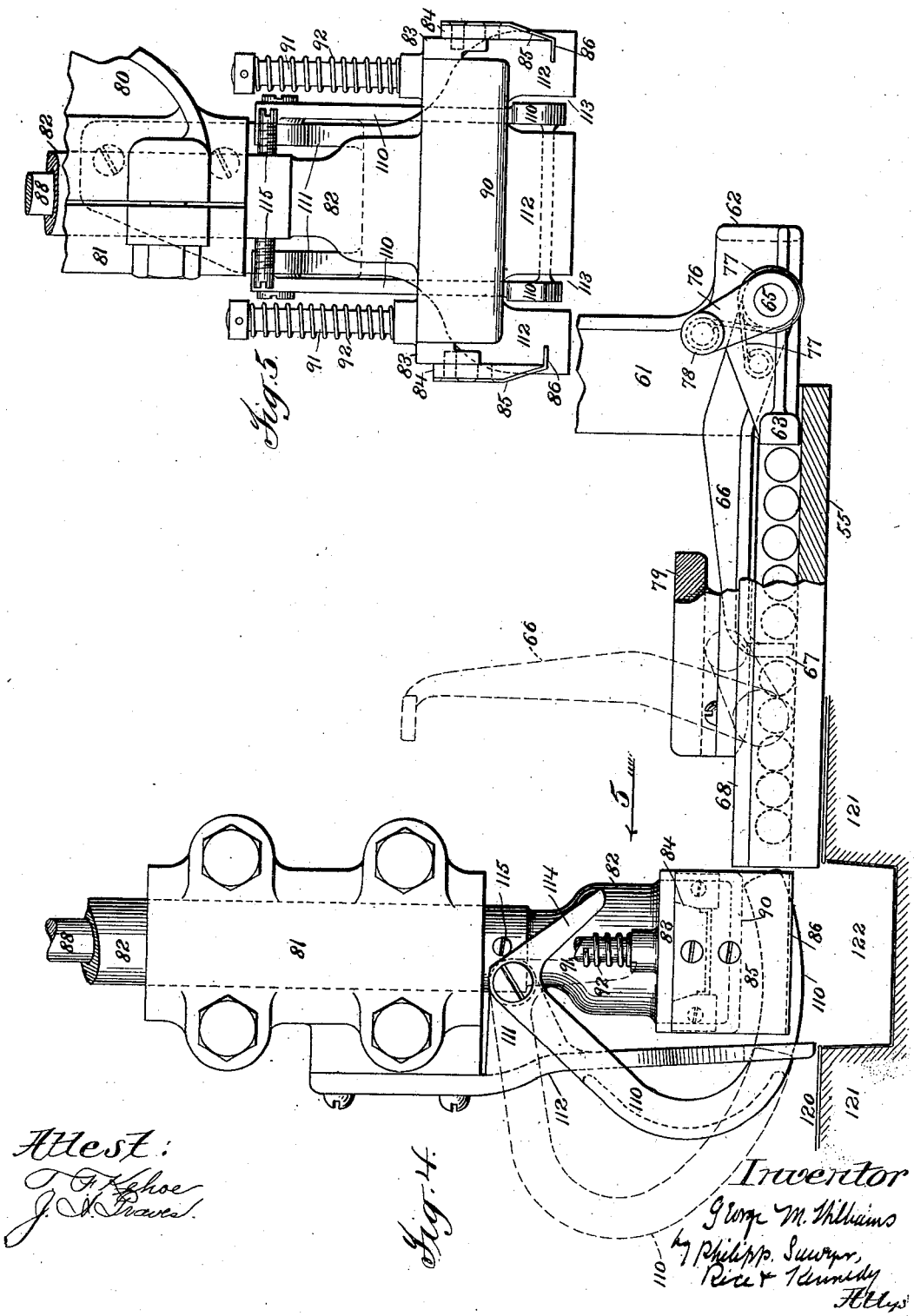

No. 708,789. Patented Sept. 9, 1902.
G. M. WILLIAMS.
MACHINE FOR BOXING LITTLE CIGARS.
(Application filed June 21, 1900.)
(No Model.)
7 Sheets—Sheet 5.

Attest.
T. O. Kehoe
J. A. Graves

Inventor:
George M. Williams
by Philipp, Sawyer, Rice & Kennedy
Attys

No. 708,789. Patented Sept. 9, 1902.
G. M. WILLIAMS.
MACHINE FOR BOXING LITTLE CIGARS.
(Application filed June 21, 1900.)
(No Model.) 7 Sheets—Sheet 6.
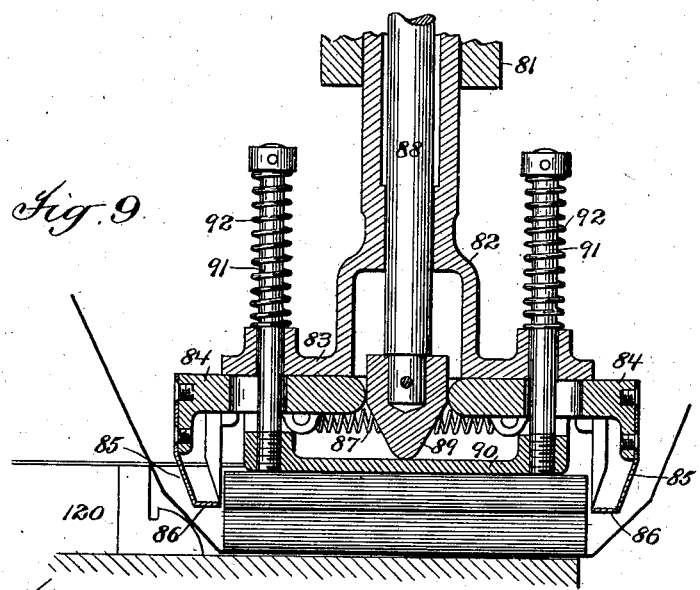
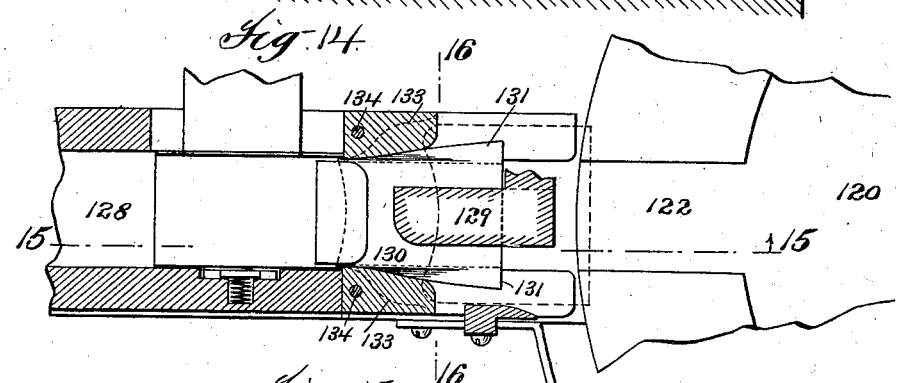
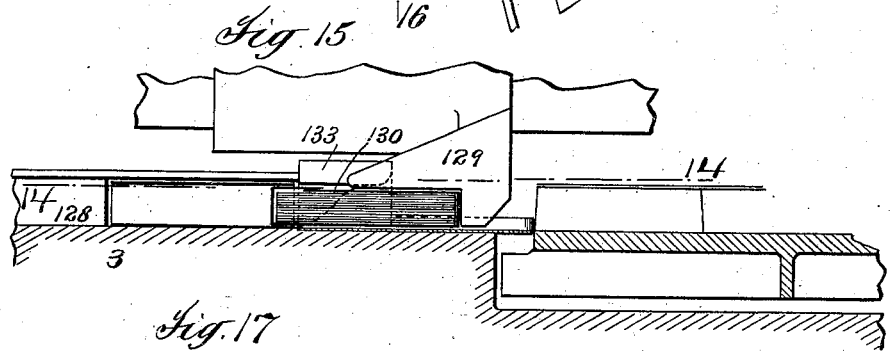
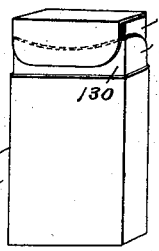
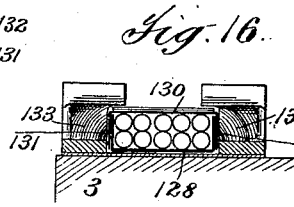

No. 708,789. Patented Sept. 9, 1902.
G. M. WILLIAMS.
MACHINE FOR BOXING LITTLE CIGARS.
(Application filed June 21, 1900.)
(No Model.) 7 Sheets—Sheet 7.
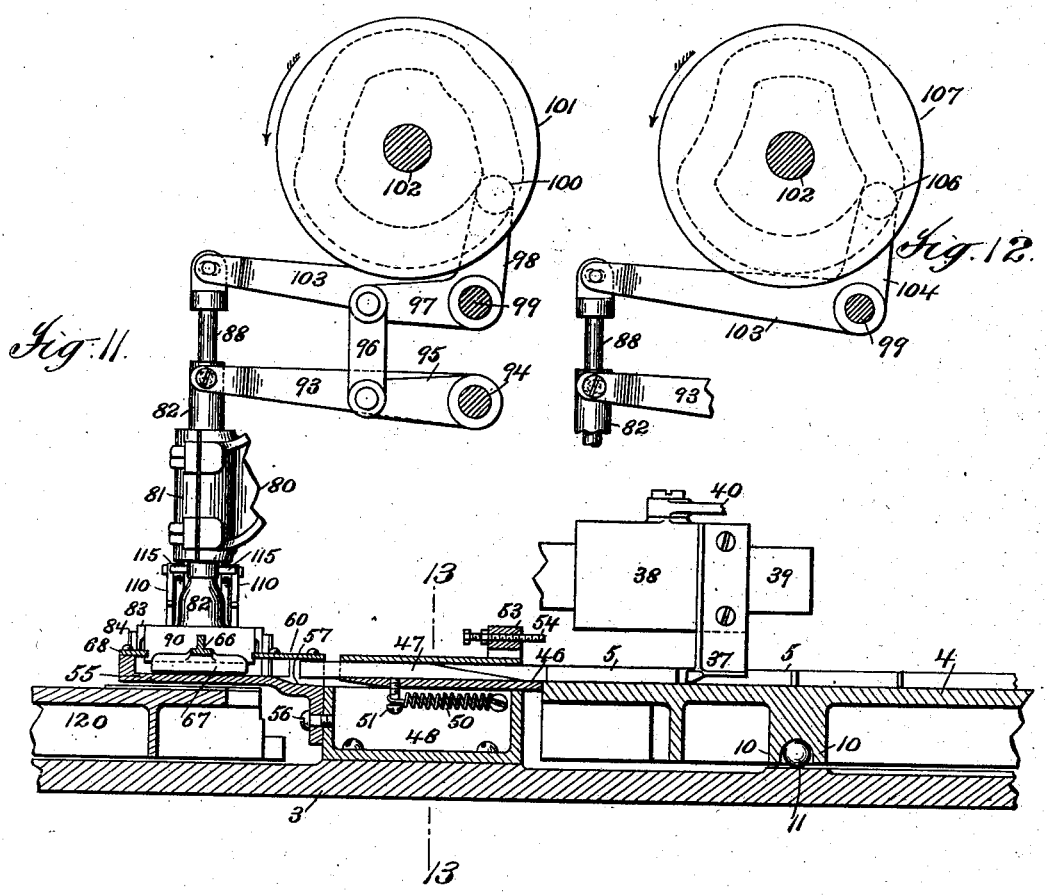
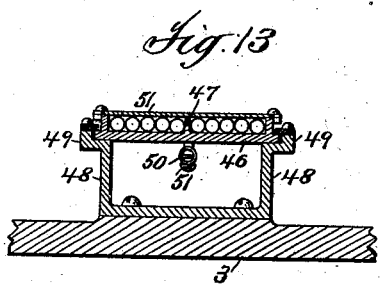
Attest:
T. F. Kehoe
J. A. Graves
Inventor:
George M. Williams
by Philipp, Sawyer, Rice & Kennedy
Attys
THE NORRIS PETERS CO., PHOTO-LITHO., WASHINGTON, D. C.

UNITED STATES PATENT OFFICE.

GEORGE M. WILLIAMS, OF BALTIMORE, MARYLAND, ASSIGNOR TO THE AMERICAN TOBACCO COMPANY, A CORPORATION OF NEW JERSEY.

MACHINE FOR BOXING LITTLE CIGARS.

SPECIFICATION forming part of Letters Patent No. 708,789, dated September 9, 1902.

Application filed June 21, 1900. Serial No. 21,033. (No model.)

*To all whom it may concern:*

Be it known that I, GEORGE M. WILLIAMS, a citizen of the United States, residing at Baltimore, State of Maryland, have invented certain new and useful Improvements in Machines for Boxing Little Cigars, fully described and represented in the following specification and accompanying drawings, forming a part of the same.

This invention relates to certain improvements in box-filling machines, and more particularly to that class of machines in which slide-boxes are filled.

The object of the invention is to improve the general construction of such machines and the groups of mechanisms employed therein, and more particularly to produce a machine for filling boxes with what is known to the trade as "little cigars," the machine being so constructed as to afford an opportunity for the sorting and inspection of the little cigars, after which the cigars by improved mechanism are automatically transferred to and packed in the boxes.

With this and other objects in view the invention consists in certain constructions and in certain parts, improvements, and combinations, as will be hereinafter fully described, and then more particularly pointed out in the claims hereunto appended.

Figure 1:
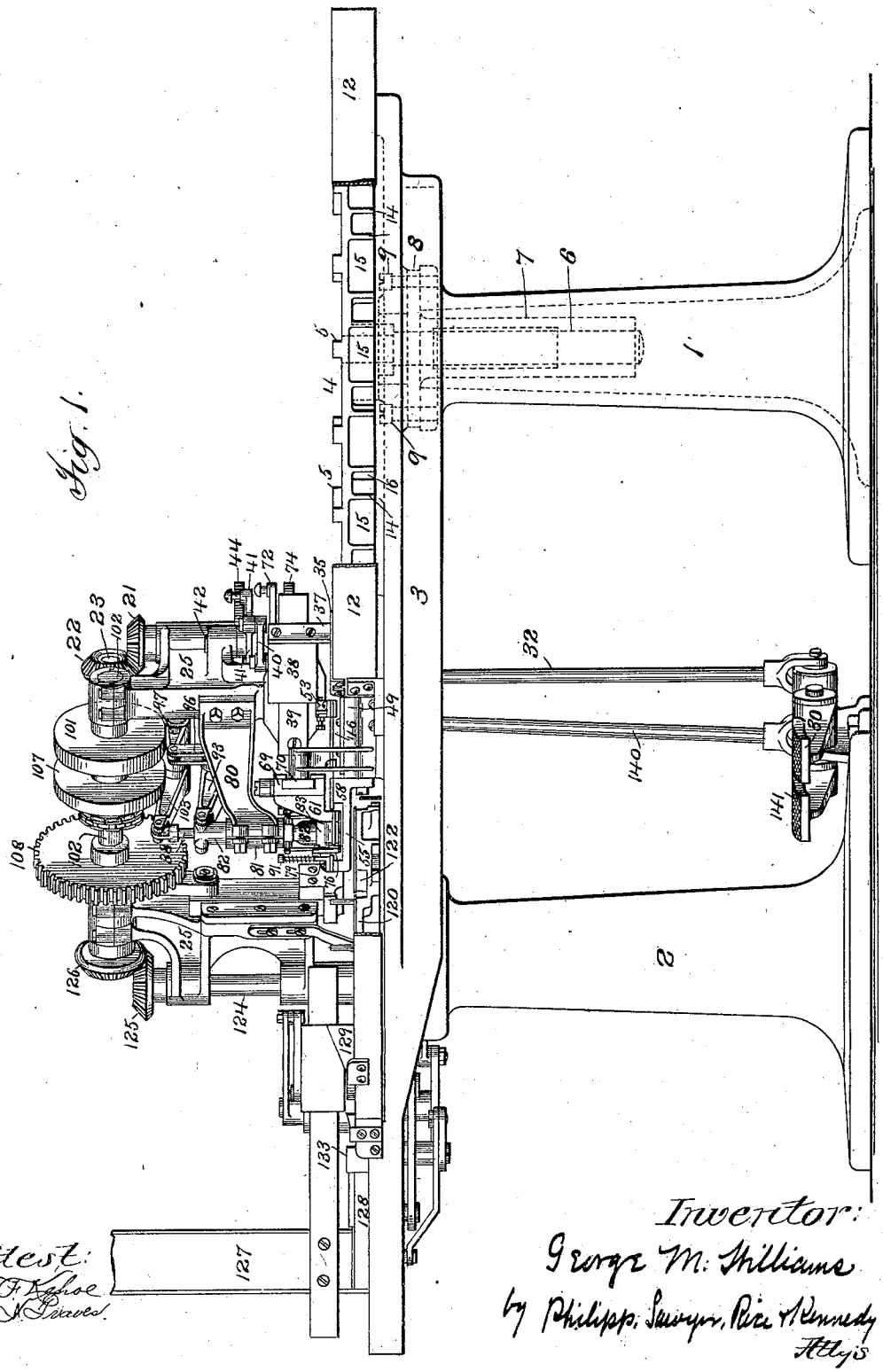
Figure 6:
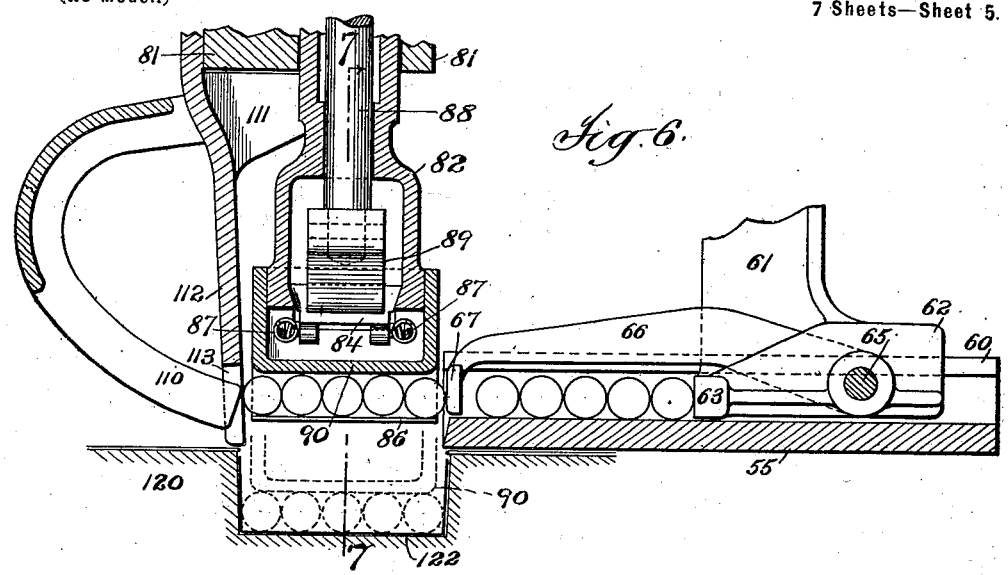
Figures 7, 8:
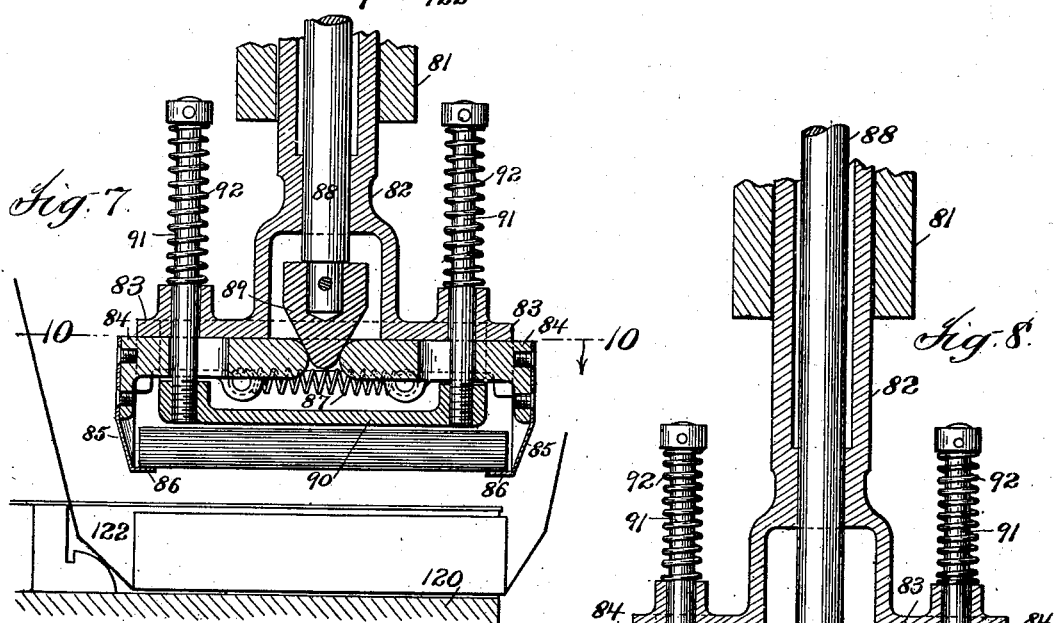
Figure 10:
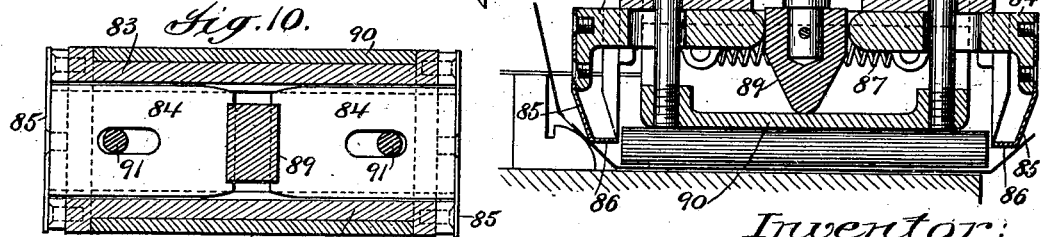

In the accompanying drawings, which form a part of this specification, and in which like characters of reference indicate the same parts, Figure 1 is a side view of a machine constructed in accordance with the invention. Fig. 2 is a top plan view of the construction shown in Fig. 1. Fig. 3 is a detail sectional plan view, on a large scale, illustrating a portion of the cigar-carrier, a portion of the box-presenting mechanism, and a portion of the transferring mechanism between the two carriers. Fig. 4 is a detail side elevation, on a large scale, illustrating the mechanism for depositing the cigars in the boxes and the forwarding-slide by which the cigars are placed in the depositing mechanism. Fig. 5 is an elevation of the depositing-plunger shown in Fig. 4, the view being taken looking in the direction of the arrow 5 in Fig. 4. Fig. 6 is a section taken on the line 6 6 of Fig. 3. Fig. 7 is a section on the line 7 7 of Fig. 6. Figs. 8 and 9 are views similar to Fig. 7, showing the parts in different positions. Fig. 10 is a sectional view on the line 10 10 of Fig. 7. Fig. 11 is a detail sectional view illustrating one of the cams for operating the depositing-plunger and the construction of the delivery-table, onto which the little cigars are pushed from the carrier. Fig. 12 is a detail view illustrating the other cam for operating the plunger. Fig. 13 is a section on the line 13 13 of Fig. 11. Fig. 14 is a plan view illustrating the construction of the raceway through which the filled boxes pass as they are inserted into the sheaths. Fig. 15 is a sectional elevation of the construction shown in Fig. 14 on the line 15 15 of Fig. 14. Fig. 16 is a section on the line 16 16 of Fig. 14. Fig. 17 is an elevation of a filled box partially inserted in its sheath or cover.

Referring to the drawings, which illustrate a preferred embodiment of the invention, the frame of the machine, which may be made of any suitable form, is shown as consisting of two standards 1 2, said standards serving to support a bed-plate 3, which in turn supports the operating parts of the machine. The machine employs two carriers—one for the little cigars or other articles to be boxed and the other for the partially-folded box-blanks, though the latter carrier might carry formed boxes, if desired. These carriers may be of any suitable construction. In the machine shown, however, the carrier is a rotating carrier (marked 4) and is provided with ribs 5, the spaces between the ribs serving as pockets for the cigars and being arranged to contain a predetermined number thereof, which is the number intended to be packed in the receptacle. Within the circumference formed by the pockets there is provided a support, which may be of any suitable construction, this support being utilized to sustain a large number of the articles to be packed. In the construction shown this support is made integral with the carrier 4, though it might be otherwise constructed, the carrier being constructed in the form of a rotating table. When the apparatus is used for packing little cigars, this gives an opportunity for the operator or operators to select cigars to be packed according to the color, so that each box may contain cigars of the same grade. The little cigars will be packed in the receptacle which is to contain them in layers, and it is therefore desirable to separate the contents of each package according to the number of layers which are to be placed in the receptacle. In the present machine the little cigars will be packed ten in a box, the ten being packed in two layers of five each. The division of the cigars into the number in each layer may be effected at any suitable time prior to their delivery to the depositing mechanism, which will be hereinafter described. In the present machine, however, the pockets between the ribs 5 preferably have located in them a separating-strip 5', which may be formed on or secured to the table in any suitable manner.

The table 4 carries a pivot-stud 6, which extends into a suitable bearing in the standard 1. In the machine shown this bearing is formed by a bushing 7, secured to a collar 8, resting on the top of the standard 1, and being secured to it by screws 9, which pass through the standard and collar and bed-plate 3. Suitable antifriction devices are or may be introduced between the table 4 and the bed-plate 3. In the machine shown this is effected by providing the under side of the table with suitable ribs 10, which form a ball-channel in which are located balls 11, the whole forming an ordinary construction of antifriction-bearing. The table 4 is surrounded by a stationary rim 12, which is secured to the bed-plate in any suitable manner, said rim being provided with a delivery-opening 13, which permits the articles contained in the pockets to be delivered from the carrier.

The carrier or table 4 is designed to receive an intermittent rotation, and any suitable mechanism may be employed for this purpose. In the construction shown the under side of the table is provided with a series of wide teeth 14, said teeth being formed with concave tops 15 and separated by spaces 16. A vertical shaft 17 is provided, to which is secured an arm 18, said arm carrying a stud or friction-roller 19, which in the revolution of the arm is caused to engage the spaces 16 between the teeth, and thus give the carrier a step-by-step forward movement. In order to prevent any shifting or movement of the carrier between the step-by-step movement given it by the arm, the shaft 17 carries a cut-away disk 20, which as the shaft revolves is arranged to engage the concavity 15 in the tooth which is opposite the shaft 17, except during the time when the arm 18 is forwarding it. The shaft 17 is provided on its upper end with a bevel-gear 21, said gear being in mesh with a similar gear 22, which is mounted on the main shaft 23, said shaft being mounted in suitable bearings 24 in a frame or casting 25, which rises from the bed-plate 3. The shaft 23 (see Fig. 2) is provided with a belt-pulley 26, which is loose on the shaft and which is or may be secured to and released from the shaft by means of a disk friction-clutch 27, the grooved hub 28 of the movable member thereof being engaged by a fork 29. This fork 29 is operated by any suitable mechanism—as, for instance, a treadle 30—to which it is connected through the medium of rods 31 32, any suitable device being used to convert the vertical motion of the rod 32 into a horizontal motion to be transmitted by the rod 31. The main shaft 23 is further provided with a hand-wheel 34. With the connections as described it will be readily understood that for each revolution of the shaft 17 the carrier or table 4 is advanced one step, the amount of rotary movement being sufficient to bring each pocket contained between the ribs 5 opposite the delivery-opening in the rim 12.

The carrier or table 4 is preferably made sufficiently large in diameter so that the services of several operators may be utilized, and as the operators inspect the cigars and sort and grade them according to color they place them in the pockets between the ribs 5, the separating-strip 5' serving to subdivide them into two lots, said lots consisting, as has been before stated, of five cigars. In order that the cigars may be evened up in the pockets, there is preferably provided an evening device which consists of a plate 35, under which each pocket passes just before it reaches the delivery-opening. This plate 35 has a guide 36 attached thereto, said guide having a curved end which operates to force the cigars back against the rim 12, thus insuring that they are truly positioned. After the cigars have been brought in front of the delivery-opening 13 a suitable transferring mechanism operates to remove them from the pockets in the carrier 4. This transferring mechanism may be varied widely in form. In the construction shown, however, it includes a reciprocating delivery-slide 37, which is preferably provided with a groove 37' to take over the separating-strip 5', said slide being secured to a guiding-block 38, which moves on a guide 39, secured to the frame or casting 25. Any suitable means may be employed for reciprocating the block 38. In the construction shown this block is connected by means of a link 40 to a lever 41, pivoted on a vertical stud 42 and provided with a cam-stud 43. This lever is held in a position so that its cam-stud 43 bears against the surface of a cam 44 by means of a spring 45, which is secured to a projection on the lever and at any suitable point to the casting or frame 25. The cam 44 is so shaped that once in each revolution of the shaft it permits a forward movement of the lever 41 under the stress of the spring 45, which, through the connections described, causes the slide 37 to move forward, sweeping the cigars or other articles to be boxed out of the pockets in the carrier 4. While the slide 37 might deliver the cigars directly to the receiving-table, to be hereinafter described, it preferably delivers them to an intermediate delivery-table 46, which is preferably movable, as will be described. This table 46 has a spacing-rib 47, which keeps the subdivided lots of cigars separate as they are forwarded by the slide 37 and is mounted on a support 48, secured to the bed-plate 3, said support being preferably provided with ways 49, so that the table may have the movement before referred to. The rib 47 (see Figs. 3 and 11) preferably has its sides inclined and its forward end beveled off, so as to avoid breaking the cigars or injuring the wrappers as they are pushed onto the table 46. The table 46 is held back against the edge of the carrier 4 in any suitable manner, as by means of a spring 50, which is secured to a screw 51 on the under side of the table and to support 48. The table is or may be provided with a suitable cover 51, which prevents the cigars from riding up as they are pushed onto the table. The table may be pushed forward against the stress of the spring 50 in any suitable manner. In the construction shown, however, a bracket 53 is provided, said bracket being secured to the edge of the table in any suitable manner, as by screws, and extending across over the cover. This bracket carries a set-screw 54, the end of which extends through and into the path of the upright arm of the slide 37. As the slide comes forward, therefore, it not only moves the cigars from the carrier 4 onto the table 46, but it also gives the table a slight forward movement, the purpose of which will be hereinafter stated.

In the present machine the cigars pass from the delivery-table, which has just been described, to a forwarding mechanism, by which in turn they are transferred to a depositing mechanism, which places them in the box. The construction of this forwarding mechanism may be varied within wide limits. In the present machine it includes a receiving-table 55, said table being supported in the machine in any suitable manner— as, for instance, by screws 56, which secure it to the support 48 of the delivery-table. The side of the table 55 which is next to the support 48 is inclined downward, as shown at 57, and the under side of the forward end of the table 46 is preferably beveled, as shown, so as to allow this table in its forward movement to extend over the inclined portion 57 of the table 55. The table 55 is provided at each end of the inclined portion 57 with upright walls 58 and 59, these walls operating to support a narrow cover-plate 60, this construction forming a closed mouth through which the cigarettes pass onto the table. The sides 46' of the delivery-table 46 and the spacing-rib 47 are made long enough to extend into this closed mouth in order to truly guide the cigars from the separating-table onto the receiving-table 55. When the table after having been pushed forward by the slide 37 is returned by its spring 50, it might happen that the cigars lying thereon would not be carried back with it—that is to say, the table would slip back without moving the cigars, or some of them might be carried back by the table and some of them might not. To insure, therefore, that the cigars lying on the table 46 are all carried back by the table and carried back evenly, the delivery end of the table is preferably made narrower than the receiving end—that is to say, it is choked somewhat. This choking of the delivery-mouth may be effected in any suitable manner, but is preferably accomplished by inclining the sides 46' of the table 46 inwardly somewhat, as is shown in Fig. 3. This choked mouth compresses the forward ends of the cigars somewhat and causes them to be snugly held in position, so that when the table is returned by its spring the cigars will be surely and evenly carried back with it. As the slide 37 operates it delivers a charge of cigars to the delivery-table and withdraws. When the table 4 has been advanced one tooth and the slide 37 again operates, the charge of cigars which is advanced by it operates to push forward the cigars already lying on the delivery-table. These cigars pass in two bunches onto the receiving-table 55, the forward movement of the table 46, which has been described, operating to insure that the cigars shall be pushed clear of the delivery-table, which retreats after the cigars have been delivered. Any danger of breaking the cigars during the subsequent manipulation of them because they are not clear of the delivery-table is thus avoided.

Suitable means are provided for transferring the cigars from the receiving-table to the depositing mechanism. While these means may be varied considerably in form, they preferably consist of a two-part plunger, which in the machine shown is constructed as follows: A bracket 61 is provided, which has cast therewith or secured thereto a slide 62, said slide having an operating-face 63, behind which is a recess 64. In the walls of this recess 64 is pivoted a short rock-shaft 65. To this shaft 65 is secured an arm 66, the forward end of which carries an operating-face 67, said face being in the construction shown integral with the arm, the forward end of the arm being bent to form the face. The arm 66 is of such a length and the construction is so arranged that when the slide 62 is in its rearward position the bent end of the arm 66 will be in line with the spacing-rib 47. The edge of the cover-plate 60, before described, forms one of the guides for the slide 62, and the table 55 is provided on its outer edge with a guide 68, so that the slide is controlled in its movement. Any suitable means may be employed for reciprocating the slide 62. In the construction shown the bracket 61 is secured to a slide 69, which runs on a guide 70, said guide being suitably supported in the machine. The slide 69 is connected by a link 71 to a lever 72, said lever being pivoted on the short shaft 42, which has been described as the pivot for the lever 41. The lever 72 has secured to it between its operating end and its pivot-point a cam roll or stud 73, which bears against a cam 74, said cam being carried on the shaft 17 and lying beneath the cam 44, before described as located on the shaft. The end of the lever opposite to that to which the link 71 is connected has secured to it a spring 75, the other end of the spring being secured to the frame 25. This spring 75 operates to hold the cam-stud 73 over against the cam 74 and also serves to operate the lever and move the slide when the configuration of the cam permits.

From the description so far given it will be seen that when the cigars are pushed forward onto the table 55 they will lie in two bundles or bunches, one of these bundles or bunches lying in front of the operating-face 67 on the arm 66 and the other in front of the operating-face 63 on the slide 62, these operating-faces being, as before indicated, arranged tandem. The cam 74 is of such a configuration that it allows the spring 75 and its connected parts to give the slide 62 two forward movements, after which it makes a return movement which is equal in amount to the two forward movements. The first of the forward movements of the slide 62 is sufficient in extent to cause the cigars which lie in front of the operating-face 67 on the arm 66 to be pushed into the depositing mechanism, to be hereinafter described. The second forward movement of the slide 62 causes the cigars which lie in front of the operating-face 63 on the slide 62 to be pushed into the depositing mechanism. In order to allow the cigars which are in front of the operating-face 63 to be pushed into the depositing mechanism, it is obvious that the arm 66 and its operating-face must be moved out of the way. This movement of the arm 66 may be effected in various ways. It has been before stated, however, that this arm is secured to a rock-shaft 65. This rock-shaft has secured to it an arm 76, and the shaft is surrounded by a coiled spring 77, one end of which is secured to the arm 76 and the other end to a part of the slide 62, the function of this spring being to normally hold the arm 66 down, so that its operating-face 67 will be in operative position. The arm 76 carries on its end a stud or antifriction-roll 78, which runs under a cam-block 79, suitably secured to the guide 68. This cam-block 79 is so arranged that the arm 76 comes in contact with it as the slide 62 begins its second forward movement. As this movement continues the shaft 65 is rocked and the arm 66 is raised from the position shown in full lines in Fig. 4 to the position shown in dotted lines in said figure.

The depositing mechanism to which the cigars are delivered and by which they are deposited in the box may be varied widely in construction. In the machine shown the frame 25 has extending therefrom on one side an arm 80, which is formed to provide a bearing 81, in which works a hollow plunger-stem 82. This stem has on its lower end a foot 83, which carries supports for the articles to be wrapped. These supports in the preferred form of the construction operate to receive the cigars in one position and are constructed to be moved out of the way as the plunger and its foot descends, so as to release the cigars and place them in the box. The construction by which these supports are mounted may be varied within wide limits. As shown, the foot is provided with sliding members 84, said members having connected thereto plates 85, having inturned flanges 86. The members 84 slide in ways in the foot 83 and are preferably connected by a spring 87, which serves to hold the sliding members in their inner position. When the members are in their inner position, the space between the supporting-plates 85 is sufficient to hold a cigar, the ends of the cigar resting on the inturned flanges 86. In the normal position of the parts, which is shown in Figs. 6 and 7, the plunger-stem 82 is raised, so as to position the supporting-plates 85 opposite to the end of the table 55. The slide 62 in its forward movement, therefore, will insert a charge of cigars—five in the present instance—into the space between the plates 85, the cigars being supported by the inturned flanges 86. The plunger-stem is now moved downward, carrying with it the foot 83 and connected parts, in order to deposit the cigars in the box. In order that the cigars may be deposited in the box, it is necessary, of course, that the sliding members 84 be moved, so as to withdraw the flanges 86 from beneath the cigars. While this may be effected in any suitable manner, in the present machine it is effected by means of a second plunger-stem 88, which works through the opening in the hollow plunger-stem 82 and has on its end a cam-head 89, which works between the inner ends of the sliding members 84. The parts are so arranged that the two plunger-stems 82 and 88 move downward together; but the plunger-stem 88 moves slightly faster than the stem 82, so that by the time the flanges 86 have reached the bottom of the box they have been moved outward by the cam-head 89. By this construction the cigars are placed in position in the box instead of being allowed to drop from the depositing-plunger. By thus causing the depositing-plunger to place or lay the cigars in the bottom of the box it is possible to insure that the cigars be truly positioned in the box, whereas if they were allowed to drop from the depositing-plunger one or more of them might fall awry in the box and be crushed as the next layer of cigars was deposited therein or the cigars were evened up by the presser-plate, to be hereinafter described. To insure the even packing of the cigars in the box, the foot 83 preferably carries a presser-plate 90, which is supported by two studs 91, surrounded by springs 92, the springs operating to normally hold the presser-plate up against the under side of the sliding members 84. As the plunger 88, carrying the cam-head 89, descends, however, this cam-head not only operates to separate the sliding members 84, but it also pushes the presser-plate 90 downward against the stress of the springs 92, thus insuring that the cigars are snugly packed in the box. After one layer of cigars has been deposited in the box it is obvious that provision must be made to prevent the depositing-plunger from entering too far into the box with its second layer of cigars, for otherwise the cigars first placed in the box would be crushed. While various mechanisms might be used to prevent an excessive relative movement between the box and the plunger, in the machine shown the plunger is given varying degrees of movement—that is to say, the downward movement it has when it deposits its first layer of cigars in the box is greater than the downward movement it has when it deposits its second layer of cigars in the box. Various means may be used for thus operating the plunger-stems 82 and 88. In the present machine, however, the plunger-stem 82 has connected to it a forked arm 93, which is connected to a short rock-shaft 94, suitably mounted in a bearing in the frame 25. This shaft 94 has connected to it an arm 95, which in turn is connected by a link 96 to one arm of a bell-crank lever 97 98, said lever being pivoted on a stud 99, suitably mounted in the frame. The arm 98 of the bell-crank lever carries a stud or antifriction-roller 100, which engages a cam-groove in a cam 101, mounted on a counter-shaft 102, said counter-shaft being located in suitable bearings in the frame 25. The plunger 88 is connected to one arm 103 of a bell-crank lever 103 104, said lever being pivoted on the stud 99 and having on the arm 104 a stud 106, which engages a cam-groove in a cam 107, also mounted on the counter-shaft 102. As the shaft 102 revolves the two cams 101 and 107 give the desired movements to the plungers connected with them.

Any suitable means may be employed for rotating the shaft 102. In the machine shown this shaft carries a gear 108, which meshes with a gear 109, loosely mounted on the main shaft 23, which may be clutched to and unclutched from said shaft by means of any suitable clutch mechanism.

In order that the cigars may be truly positioned on the supporting-flanges 86, means are preferably provided to guide and hold the cigars while they are pushed in by the operating-faces 67 and 63. These means may be considerably varied in construction. As shown, however, they consist of two curved arms 110, which are pivoted on a bracket 111, secured to the bearing 81, in which the plungers 82 88 move. These arms are so hung that they normally swing by gravity into the space beneath the sliding members 84 and between the supporting-plates 85. These arms are, however, loosely pivoted and are sufficiently light so that they are pushed back by the incoming layer of cigars. Their weight is, however, sufficient to hold the cigars snugly against the operating-faces, and thus prevent the cigars from twisting or becoming misplaced as they are advanced by the slide. In order to prevent the cigars from being pushed too far into the space in the depositing-plunger, the bracket 111 is secured to or formed in one piece with a guard 112, said guard being provided with slots 113, through which the arms 110 swing. As it might sometimes happen that the machine would be operated when there were no cigars to be pushed in by the slide, the curved arms 110 are provided with extensions 114, which lie in the path of studs 115, secured to the plunger-stem 82. As the plunger-stem descends, therefore, the curved arms will be positively pushed back in case there are no cigars to force them back.

The devices for presenting the box to the depositing mechanism may be varied widely in form and may operate to present either a complete or a partially-folded box to said mechanism. As shown, however, said devices operate to present a partially-folded box-blank to the depositing mechanism, the folding of the blank being completed after the cigars are placed therein, and the box thus formed being inserted in a slide. The box-presenting mechanism in the present machine comprises a rotating carrier 120, said carrier being mounted in any suitable or desired manner on the bed 3, so as to rotate thereon. The carrier 120 is provided with blocks 121, which are arranged so as to form between them box-receiving pockets 122. This rotating carrier is generally similar to that shown and described in the patent to Butler and Landfear, No. 482,542, granted September 13, 1892, and, as in that case, the receiving-pockets constitute matrices which operate in connection with a suitable die to partially form a blank, which is fed between each of them and the die into a box. The carrier 120 is rotated by a construction similar to that by which the carrier 4 is rotated—that is to say, it is provided on its under side with teeth (see dotted lines, Fig. 3) similar to the teeth on the carrier 4, these teeth being engaged by a rotating arm 123, which is mounted on a vertical shaft 124, said shaft carrying a bevel-gear 125, which meshes with a similar gear 126 on the counter-shaft 102. As in the machine disclosed in the patent referred to, the blank is formed from a strip of pasteboard which is cut and scored by a suitable mechanism, after which it is fed to the carrier 120, a suitable knife operating to cut each blank from the strip. The mechanisms by which these several functions are accomplished are or may be similar to those set forth in the said patent and need not, therefore, be specifically described here. As the carrier 120 receives its step-by-step movement it brings the partially-formed boxes beneath the depositing-plunger, and the cigars are placed by the plungers in the boxes. The continued movement of the carrier brings the filled boxes around to the point where they are to be inserted in the cover-sheaths. It may be here remarked that the sheaths are removed from a magazine for holding them (herein marked 127) and opened up to receive the filled boxes by mechanism which is or may be substantially the same as that disclosed in the said patent to Butler and Landfear, and reference is made to the specification of that patent for a description of the parts shown for that purpose. The filled boxes are forwarded through a raceway 128 by means of a slide 129, which is or may be constructed and operated in substantially the same manner as that disclosed in the patent referred to, and reference is accordingly made to said patent for a full description of this part of the mechanism also. This raceway is constructed to maintain the sides of the box which have been turned up by the box-receiving pockets in their formed or upturned position. The box used in this machine, however, is somewhat different from the box described in the patent above referred to. The top flap 130 (see Figs. 16 and 17) of this box is provided with side wings 131, which overlie the side wings 132, which are turned up from the bottom of the box. The reason for this construction is to make the box stiffer at the sides, the box being intended to hold in the present instance little cigars, the wrappers of which are more fragile and therefore more liable to injury than the paper cigarettes which are intended to be packed by the machine disclosed in said patent. The raceway 128 is therefore provided with turner-guides 133, said guides being secured to the frame by studs 134. (See Fig. 14.) The office of these turner-guides is to turn down the flaps 131, and the operating-face of each of them is "warped"—that is to say, it is curved inwardly from its top to its bottom edge and is also curved backwardly from its delivery end, so as to turn down the flaps smoothly and evenly. Aside from these guides 133 the mechanism shown for inserting the filled boxes into the sheaths is or may be the same as that illustrated and described in the patent referred to.

It may sometimes happen that the operators will fail to fill a pocket in the rotating carrier 4. When this occurs, it is desirable to stop that part of the machine which embodies the depositing mechanism, the box-presenting carrier, and the several parts connected therewith. These parts are all primarily operated from the counter-shaft 102, which, as before said, is driven by the intermeshing gears 108 109, the gear 109 being loosely mounted on the shaft 23. A suitable clutch is interposed between the gear 109 and the shaft 23, so that when it is desired the gear 109 may be disconnected from the shaft, which brings to a stop all the mechanisms referred to as driven from the counter-shaft 102. Any suitable form of clutch may be used for this purpose. In the construction shown, however, the shaft 23 has a collar 135 fast thereon, and the hub 136 of the gear 109 has a sliding pin 137 mounted therein, which normally locks the hub 136 to the collar 135. A pivoted bell-crank arm 138 has a projection 139, which as the gear rotates will, if thrown forward, pass between the gear and the head of the pin 137, withdrawing the pin and disconnecting the hub of the gear from the collar 135. This bell-crank arm may be operated in any suitable manner—as, for instance, by a rod 140, connected to a treadle 141. The form of clutch which has been described is old, and no claim is therefore made to it specifically. The location and operation of the clutch are, however, believed to be new.

The general operation of the machine is as follows: The operator or operators lay the cigars in the pockets of the rotating carrier 4, said carrier being given a step-by-step movement by means of the arm 18 on the shaft 17. As each pocket comes into position in front of the slide 37 the slide is operated through the means described to push the cigars, divided into two lots or bunches by the separating-strip 5', from the carrier 4 onto the delivery-table, the bunches being kept separate by the spacing-rib 47. It will be assumed for the purposes of description that the contents of one of the pockets in the table 4 have already been pushed onto the delivery-table 46. As the slide 37 operates, therefore, the cigars which it forwards transfer the cigars which are on the table 46 to the table 55, the table 46 being at the same time pushed forward against the stress of the spring 50 by the contact of the screw 54 with the slide 37. As the slide retreats the table 46 is pulled back by its spring, and thus a clearance between the cigars on the table 55 and the table 46 is insured. At the time when the cigars are transferred to the table 55 the slide 62 is in the position shown in full lines in Fig. 4, so that the cigars are pushed onto the table in two bunches of five each, one bunch being in front of the operating-face 67 of the arm 66 and the other bunch in front of the operating-face 63 of the slide 62. As soon as the cigars have been placed on the table 55 the slide 62 is operated through the parts before described, and the forward bunch of cigars is pushed into the depositing-plunger against the force of the swinging arms 110, the cigars resting on the inturned supporting-flanges 86. The plungers 82 and 88 now descend, the plunger 88 traveling somewhat faster than the plunger 82, so that just before the cigars reach the bottom of the box the flanges 86 are withdrawn, allowing the cigars to be deposited in the box. The plunger 88 continues its movement, however, and forces the presser-plate 90 down, so as to pack the cigars snugly into the box. The plungers 82 88 now retreat, and the slide 62 resumes its movement, forcing the second layer of cigars into the carrying-space in the depositing-plunger. The plungers 82 88 now make their second descent, the movement of these plungers being less on this descent because of the cigars already in the box. The operations performed during the first descent are, however, repeated. The plungers now retreat, and the carrier 120 is revolved. The operations described are repeated until the carrier 120 brings a filled box in front of the raceway 128. When this occurs, the forwarding-slide 129 is operated to push the box from the pocket 122 into the raceway 128, the turner-guides operating to turn down the flaps on the side of the box. A sheath has in the meantime been removed from the magazine 127 by means of the mechanism described in the patent referred to in this specification and has been opened up, so that the movement of the slide pushes the filled boxes into the sheath.

It is to be understood that the various mechanisms described in the foregoing specification for carrying the several features of the invention into effect may be widely varied in construction, and it will be further understood that certain of these mechanisms may be used either independently or with other mechanisms dissimilar in character to those described in this specification. It will also be understood that while the invention is particularly designed for boxing cigars it may be used either in whole or in part for boxing other articles. The invention is not, therefore, to be limited to the specific use described nor to the specific constructions herein set forth.

No claim is herein made to the construction shown and described in the application of Oluf Tuberg, filed November 22, 1898, Serial No. 697,123.

What is claimed is—

1. In a box-filling machine, the combination with a carrier constructed to support on one of its surfaces and to successively forward predetermined quantities of the articles to be boxed, of a box-presenting mechanism operating to successively bring boxes into position to receive the articles from the carrier, and transferring means, said transferring means operating to cause the quantities of the article to move across the surface of the carrier and to the boxes as they are successively presented, substantially as described.

2. In a box-filling machine, the combination with a rotating carrier constructed to support on one of its surfaces and to successively forward predetermined quantities of the article to be boxed, of a box-presenting mechanism operating to successively bring boxes into position to receive the articles from the carrier, and transferring means, said transferring means operating to cause the quantities of the article to move across the surface of the carrier and to the boxes as they are successively presented, substantially as described.

3. In a box-filling machine, the combination with a rotating carrier constructed to support on one of its surfaces and to successively forward predetermined quantities of the article to be boxed, of a rotating box-presenting mechanism operating to successively bring boxes into position to receive the articles from the carrier, and transferring means, said transferring means operating to cause the quantities of the article to move across the surface of the carrier and to the boxes as they are successively presented, substantially as described.

4. In a box-filling machine, the combination with a carrier, one of the surfaces of which is provided at its edge with a series of pockets whereby it is adapted to successively forward predetermined quantities of the articles to be boxed, of an interior support capacitated to sustain a large number of the articles, a box-presenting mechanism operating to successively bring boxes into position to receive the articles from the carrier, and transferring means, said transferring means operating to cause the quantities of the article to move across the surface of the carrier and to the boxes as they are successively presented, substantially as described.

5. In a box-filling machine, the combination with a carrier consisting of a rotating table, one of the surfaces of which is provided at its edge with a series of pockets whereby it is adapted to successively forward predetermined quantities of the articles to be boxed, that part of the table inside the pockets being capacitated to support a large number of the articles, of a box-presenting mechanism operating to successively bring boxes into position to receive the articles from the carrier, and transferring means, said transferring means operating to cause the quantities of the article to move across the surface of the carrier and to the boxes as they are successively presented, substantially as described.

6. In a box-filling machine, the combination with a rotating carrier, one of the surfaces of which is provided at its edge with a series of pockets whereby it is adapted to successively forward predetermined quantities of the articles to be boxed, of an interior support capacitated to sustain a large number of the articles, a rotating box-presenting mechanism operating to successively bring boxes into position to receive the articles from the carrier, and transferring means, said transferring means operating to cause the quantities of the article to move across the surface of the carrier and to the boxes as they are successively presented, substantially as described.

7. In a box-filling machine, the combination with a carrier consisting of a rotating table, one of the surfaces of which is provided at its edge with a series of pockets whereby it is adapted to successively forward predetermined quantities of the articles to be boxed, that part of the table inside the pockets being capacitated to support a large number of the articles, of a rotating box-presenting mechanism operating to successively bring boxes into position to receive the articles from the carrier, and transferring means, said transferring means operating to cause the quantities of the article to move across the surface of the carrier and to the boxes as they are successively presented, substantially as described.

8. The combination with a carrier constructed to successively forward predetermined quantities of the article to be boxed, of means for separating the predetermined quantity so that it may be packed in the box in layers, box-presenting means, depositing mechanism, and transferring means operating between the carrier and the depositing mechanism, substantially as described.

9. The combination with a rotating carrier constructed to successively forward predetermined quantities of the article to be boxed, of means for separating the predetermined quantity so that it may be packed in the box in layers, box-presenting means, depositing mechanism, and transferring means operating between the carrier and the depositing mechanism, substantially as described.

10. The combination with a carrier constructed to successively forward predetermined quantities of the article to be boxed, of a box-presenting mechanism, depositing mechanism, transferring mechanism between the carrier and the depositing mechanism, separating means operating to divide the predetermined quantity into bunches, and spacing means for keeping said bunches separate as they are forwarded by the transferring mechanism, substantially as described.

11. The combination with a rotating carrier constructed to successively forward predetermined quantities of the article to be boxed, of a box-presenting mechanism, depositing mechanism, transferring mechanism between the carrier and the depositing mechanism, separating means operating to divide the predetermined quantity into bunches, and spacing means for keeping said bunches separate as they are forwarded by the transferring mechanism, substantially as described.

12. The combination with a rotating carrier constructed to successively forward predetermined quantities of the article to be boxed, of a rotating box-presenting mechanism, depositing mechanism, transferring mechanism between the carrier and the depositing mechanism, and separating means operating to divide the predetermined quantity into bunches, and spacing means for keeping said bunches separate as they are forwarded by the transferring mechanism, substantially as described.

13. The combination with a carrier constructed to successively forward predetermined quantities of the article to be boxed, of a box-presenting mechanism, depositing mechanism operating to deliver the articles to be boxed to the boxes in layers, a forwarding device, means for transferring the predetermined quantities to the forwarding device divided to form layers, and means for operating the forwarding device, substantially as described.

14. The combination with a rotating carrier constructed to successively forward predetermined quantities of the article to be boxed, of a box-presenting mechanism, depositing mechanism operating to deliver the articles to be boxed to the boxes in layers, a forwarding device, means for transferring the predetermined quantities to the forwarding device divided to form layers, and means for operating the forwarding device, substantially as described.

15. The combination with a rotating table having ribs which divide it into pockets, of spacing devices in the pockets, a stationary rim having a delivery-opening within which the table rotates, and means for delivering the articles from the pockets, substantially as described.

16. The combination with a rotating table having ribs which divide it into pockets, of a stationary rim having a delivery-opening within which the table rotates, an evening device, and means for delivering the articles from the pockets, substantially as described.

17. The combination with a rotating table having ribs which divide it into pockets, of spacing devices in the pockets, a stationary rim having a delivery-opening within which the table rotates, an evening device, and means for delivering the articles from the pockets, substantially as described.

18. The combination with a rotating table having ribs which divide it into pockets, of a stationary rim having a delivery-opening within which the table rotates, an evening-plate having a curved guide connected thereto, a delivery-slide, and means for operating the slide, substantially as described.

19. The combination with a rotating table having ribs which divide it into pockets, of spacing devices in the pockets, a stationary rim having a delivery-opening within which the table rotates, an evening-plate having a curved guide connected thereto, a delivery-slide, and means for operating the slide, substantially as described.

20. The combination with a carrier constructed to successively forward predetermined quantities of the articles to be boxed, a delivery-table provided with spacing means, and means for transferring the predetermined quantities from the carrier to the delivery-table, substantially as described.

21. The combination with a table having a spacing-rib, of means for delivering articles to the table in predetermined quantities and in the direction of the length of the rib whereby the rib subdivides the quantities, substantially as described.

22. The combination with a table, of a cover-plate therefor, a spacing-rib having its forward end beveled off, and means for delivering articles to the table in predetermined quantities, substantially as described.

23. The combination with a table, of a cover-plate therefor, a spacing-rib having its forward end beveled off and its sides inclined, and means for delivering articles to the table in predetermined quantities, substantially as described.

24. The combination with a delivery-table operating to support a plurality of cigars or similar articles, of a table to which said delivery-table delivers the article, and means for moving the delivery-table toward the other table as the delivery operation is effected and away from the other table after the delivery operation is completed so as to obtain clearance, substantially as described.

25. The combination with a delivery-table provided with a spacing-rib, of a slide for delivering articles thereto, a table to which said table delivers, and means whereby the slide moves the delivery-table toward the other table as the delivery operation is effected, substantially as described.

26. The combination with a delivery-table provided with a spacing-rib, of a slide for delivering articles thereto, a table to which said table delivers, means whereby the slide moves the delivery-table toward the other table as the delivery operation is effected, and a spring for returning the delivery-table, substantially as described.

27. The combination with a delivery-table having a spacing-rib, of a second table to which it delivers, a slide for delivering articles to the delivery-table, adjustable means between the delivery-table and the slide, whereby the slide moves the table, and means for returning the table, substantially as described.

28. The combination with a delivery-table having a spacing-rib, of a second table to which said table delivers, a cover-plate for said delivery-table, a bracket also carried by said table, a screw carried by the bracket, the end of which is adapted to be struck by the slide to move the delivery-table, and a spring for returning the table, substantially as described.

29. The combination with a carrier for forwarding articles such as cigars, of the receiving-table to which the cigars are to be delivered, an intermediate table operating to support a plurality of cigars, and means for giving the intermediate table a movement toward the receiving-table, as the delivery operation is effected and away from said table after the operation is completed, so as to obtain clearance, substantially as described.

30. The combination with a carrier for forwarding articles, of a receiving-table to which they are to be delivered, and an intermediate movable table between the carrier and the receiving-table, said table having a choked mouth, substantially as described.

31. The combination with a rotating carrier for forwarding articles, of a receiving-table to which they are to be delivered, an intermediate table between the carrier and the receiving-table and means for giving the intermediate table a bodily movement from the carrier to the receiving-table, substantially as described.

32. The combination with a rotating carrier for forwarding articles, of a receiving-table to which they are to be delivered, and an intermediate movable table between the carrier and the receiving-table, said table having a choked mouth, substantially as described.

33. The combination with a rotating carrier operating to forward articles in predetermined quantities, of means for delivering articles therefrom, a receiving-table to which the articles are to be delivered, and a movable table intermediate the carrier and the receiving-table, said table being operated by the delivering means, substantially as described.

34. The combination with a rotating carrier operating to forward articles in predetermined quantities, of means for delivering articles therefrom, a receiving-table to which the articles are to be delivered, and a movable table having a choked mouth intermediate the carrier and the receiving-table, said table being operated by the delivering means, substantially as described.

35. The combination with a rotating carrier operating to forward articles in predetermined quantities, of a slide for delivering articles therefrom, a receiving-table to which the articles are to be delivered, and a movable table intermediate the carrier and the receiving-table, said table being operated by the slide, substantially as described.

36. The combination with a rotating carrier operating to forward articles in predetermined quantities, of a slide for delivering articles therefrom, a receiving-table to which the articles are to be delivered, and a movable table having a choked mouth intermediate the carrier and the receiving-table, said table being operated by the slide, substantially as described.

37. The combination with a table, of a forwarding device having a plurality of operating-faces arranged tandem, and means operating to deliver articles to the table in position to be acted on by each of the operating-faces, substantially as described.

38. The combination with a table, of a forwarding-slide having a plurality of operating-faces arranged tandem, and means for delivering articles to the table in front of each of the faces, substantially as described.

39. The combination with a table, of a forwarding-slide having two operating-faces, one lying in front of the other, means for giving the slide two forward movements, means for moving the forward operating-face out of the path of the slide between the forward movements of the slide, and means for returning the slide, substantially as described.

40. The combination with a carrier constructed to forward articles in predetermined quantities, of a table, a slide having a plurality of operating-faces, and means for successively transferring the predetermined quantities of articles from the carrier to the table, a part of each predetermined quantity lying in front of each operating-face of the slide, and means for operating the slide, substantially as described.

41. The combination with a carrier constructed to successively forward articles in predetermined quantities, of a table having a spacing-rib, a second table, a forwarding device having a plurality of operating-faces coacting with said second table, and a delivery device operating to deliver the articles from the carrier to the first table, the tables being arranged sufficiently close to each other so that the articles forwarded by the delivery device to the first table operate to push the articles from the first table onto the second table, substantially as described.

42. The combination with a carrier constructed to successively forward articles in predetermined quantities, of a movable table having a choked mouth, a delivery-slide operating to transfer the articles from the carrier to the table, a second table to which the articles are delivered from the movable table, and a second slide having a plurality of operating-faces coacting with said second table, substantially as described.

43. The combination with a carrier constructed to successively forward articles in predetermined quantities, of a movable table having a choked mouth, a delivery-slide operating to transfer the articles from the carrier to the table, a second table to which the articles are delivered from the movable table, a second slide having two operating-faces, one lying in front of the other, means for giving this slide two forward movements, means for moving the forward operating-face out of the path of the slide, and means for returning the slide, substantially as described.

44. The combination with a receiving-table, of a slide having two operating-faces, a box-support, a depositing mechanism to which the slide delivers, means for giving the slide successive forward movements to enable each operating-face to deliver to the depositing mechanism, and means for moving the operating-face which is nearer the depositing mechanism out of the path of the slide after it has delivered to the depositing mechanism, substantially as described.

45. The combination with a box-support, of a depositing mechanism, a table, a slide having a plurality of operating-faces, means for moving the slide, and means for moving the operating-face which is nearest the depositing mechanism out of the path of the slide after it has delivered to the depositing mechanism, substantially as described.

46. The combination with a box-support, of a depositing mechanism, a table, a slide moving thereover, said slide having an operating-face, an arm pivoted to the slide and also having an operating-face which is in front of the operating-face on the slide, means for moving the slide toward the depositing mechanism, and means for moving the arm so as to move its face out of the path of the slide after said face has delivered to the depositing mechanism, substantially as described.

47. The combination with a box-support, of a depositing mechanism, a table, a slide having an operating-face, an arm pivoted to the slide and also having an operating-face which lies in front of the operating-face on the slide, means for giving the slide successive forward movements, and means for moving the arm to cause it to move its operating-face out of the path of the slide between successive forward movements of the slide, substantially as described.

48. The combination with a box-support, of a depositing mechanism, a table, a slide moving thereover and having an operating-face, an arm pivoted to the slide and also having an operating-face which lies in front of the operating-face on the slide, a rock-arm, connections between the two arms, and means for operating the rock-arm as the slide is moved forward, substantially as described.

49. The combination with a box-support, of a depositing-plunger carrying supporting devices, means for delivering articles, and positioning devices adapted to be moved out of the way by the articles as they are delivered to the supporting devices, substantially as described.

50. The combination with a depositing-plunger, of supporting devices carried thereby, a slide for delivering articles to the supporting devices, and positioning devices operating against the articles which are moved forward by the slide, substantially as described.

51. The combination with a depositing-plunger, of supporting-flanges carried by the plunger, pivoted positioning-arms normally lying in the space between the supporting-flanges, and means for delivering articles to the flanges, the articles as they are delivered to the flanges operating to move the positioning-arms out of the way, substantially as described.

52. The combination with a depositing-plunger, of supporting-flanges carried by the plunger, curved pivoted positioning-arms normally lying in the space between the supporting-flanges, and means for delivering the articles to the flanges, the articles as they are delivered to the flanges operating to move the positioning-arms out of the way, substantially as described.

53. The combination with a box-support, of a depositing-plunger, sliding members carried by the plunger, said sliding members having supports secured thereto, means for moving the plunger toward the box, and means for moving the sliding members to move the supports and cause them to deliver the articles, substantially as described.

54. The combination with a box-support, of a depositing-plunger, supports carried by the plunger, a second plunger, means for moving the two plungers toward the box, and means whereby the movement of the second plunger operates to move the supports carried by the first plunger so as to cause them to deliver the articles carried by them, substantially as described.

55. The combination with a box-support, of a plunger, supports carried by the plunger, a second plunger, a packing device, means for moving the two plungers toward the box, and means whereby the movement of the second plunger operates to move the supports and the packing device, substantially as described.

56. The combination with a box-support, of a plunger, sliding members carried thereby, supports mounted on the members, a second plunger having a cam-head for operating the sliding members, and means for moving the two plungers toward the box, substantially as described.

57. The combination with a box-support, of a plunger, sliding members carried thereby, supports secured to the members, a second plunger having a cam-head working through the first plunger, a spring-mounted packing device, and means for moving the two plungers toward the box, the movement of the second plunger operating the sliding members and the spring-mounted packing device, substantially as described.

58. The combination with a box-support, of a depositing-plunger, sliding members carried thereby, supports secured to the members, a second plunger working through the first plunger and having a cam-head which operates the sliding members, a packing device carried by the first plunger, means for giving the two plungers different degrees of movement toward the box, the movement of the second plunger operating the sliding members and the packing device, substantially as described.

59. The combination with a box-support, of a depositing-plunger, supports carried by the plunger, a slide having a plurality of operating-faces, each face operating to insert a layer of articles in the plunger, means for giving the plunger different amounts of movement toward the box after each layer is inserted therein, and means for moving the supports to cause them to deliver the articles for each movement of the plunger toward the box, substantially as described.

60. In a machine for boxing articles, the combination with a rotating carrier having pockets thereon, of a receiving-table, means for transferring the articles from the carrier to the receiving-table, a forwarding-slide having two operating-faces working over the receiving-table, a box-support, a depositing-plunger having supporting means for the articles, means for giving the forwarding-slide successive forward movement, means for lifting one of the operating-faces out of the path of the slide between the movements, means for giving the depositing-plunger varying degrees of movement toward the box in order to enable it to insert the layers of articles in the box which are delivered to it by the successive movements of the slide, and means for moving the supporting means on the plunger to cause them to deliver the articles, substantially as described.

61. In a machine for boxing articles, the combination with a rotating carrier having pockets thereon, of a receiving-table, means for transferring the articles from the carrier to the receiving-table, a forwarding-slide having two operating-faces working over the receiving-table, a rotating box-support, a depositing-plunger having supporting means for the articles, means for giving the forwarding-slide successive forward movements, means for lifting one of the operating-faces out of the path of the slide between the movements, means for giving the depositing-plunger varying degrees of movement toward the box in order to enable it to insert the layers of articles in the box which are delivered to it by the successive movements of the slide, means for moving the supporting means on the plunger to cause them to deliver the articles, a raceway, means for delivering sheaths or covers to the raceway, and means for inserting the filled boxes in the sheaths, substantially as described.

62. In a mechanism for inserting boxes into sheaths, the combination with a raceway constructed to maintain the sides of the boxes in formed position, of means for forwarding boxes through the raceway, and a warped turner-guide on each side of the raceway positioned to act upon the side wings of the top flange of the box, substantially as described.

63. The combination with a carrier, of a shaft by which it is driven, a counter-shaft, clutch-controlled driving means between the two shafts, a box-support driven from the counter-shaft, and transferring devices between the carrier and the support, whereby both the carrier and the support may be caused to operate together or the carrier may be caused to operate without operating the support, substantially as described.

64. The combination with a rotating carrier, of a shaft from which it is driven, a power mechanism, a clutch between said shaft and the power mechanism, delivery devices driven from said shaft, a second shaft, clutch-controlled driving mechanism between the two shafts, a box-support, and a depositing mechanism driven from the second shaft, substantially as described.

In testimony whereof I have hereunto set my hand in the presence of two subscribing witnesses.

GEORGE M. WILLIAMS.

Witnesses:
LEE PURCELL,
THOS. KELL BRADFORD.